United States Patent [19]

Sasaki et al.

[11] 4,393,165
[45] Jul. 12, 1983

[54] POLYMER COMPOSITIONS

[75] Inventors: Takashi Sasaki, Takasaki; Miyuki Hagiwara, Maebashi; Fumio Hosoi, Fujioka; Tohru Takagi, Hiratsuka, all of Japan

[73] Assignee: Japan Atomic Energy Research Institute, Tokyo, Japan

[21] Appl. No.: 406,974

[22] Filed: Aug. 9, 1982

[30] Foreign Application Priority Data

Aug. 12, 1981 [JP] Japan .................. 56-126458

[51] Int. Cl.³ .................. C08G 63/76; C08L 67/00
[52] U.S. Cl. .................. 525/10; 525/502; 525/529; 528/99; 528/100; 528/101
[58] Field of Search .................. 525/10, 502, 529; 528/99, 100, 101

[56] References Cited

U.S. PATENT DOCUMENTS

| | | | |
|---|---|---|---|
| 3,773,856 | 11/1973 | Takiyama et al. | 525/529 |
| 4,107,116 | 8/1978 | Riew et al. | 525/529 |
| 4,110,187 | 8/1978 | Sloan et al. | 525/10 |
| 4,127,615 | 11/1978 | Zahir et al. | 525/502 |
| 4,269,947 | 5/1981 | Inata et al. | 525/10 |

*Primary Examiner*—Lucille M. Phynes
*Attorney, Agent, or Firm*—Browdy & Neimark

[57] ABSTRACT

A polymer composition is herein disclosed, which consists essentially of:
(A) 90 to 50 wt % of a saturated polymer having in one molecule (1) at least two groups of at least one type selected from the group consisting of an epoxy group of the formula

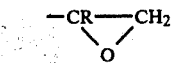

(R is hydrogen or methyl), an alcoholic or phenolic hydroxyl group and an alkoxymethyl-substituted acid amide group of the formula

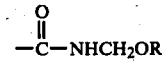

(R is an alkyl group of $C_1$ to $C_4$) and (2) a repeating unit made of a nonaromatic methylene group or methine group; and
(B) 50 to 10 wt % of a nonfunctional radical polymerizable monomer mixture consisting of (a) a radical polymerizable monomer having in one molecule at least one functional group selected from the group consisting of a carboxyl group, an acid anhydride group, an alcoholic hydroxyl group, an alkoxymethyl-substituted acid amide group of the formula

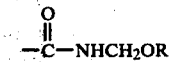

(R is an alkyl group of $C_1$ to $C_4$) and an amino group of the formula $-NR_1R_2$ ($R_1$ and $R_2$ are each an alkyl group of $C_1$ to $C_8$) and an ethylenic double bond, and (b) a radical polymerizable monomer having one epoxy ring and one ethylenic double bond in one molecule.

12 Claims, No Drawings

POLYMER COMPOSITIONS

FIELD OF THE INVENTION

The present invention relates to a polymer composition, more particularly to a polymer composition comprising a mixture of radical polymerizable monomers having specified reactive groups and a non-radical polymerizable polymer. Upon irradiation with electron beams under certain conditions, the polymer composition of the present invention can be converted to a self-thermosettable polymeric material having a network structure that can be formed into articles of various shapes having improved properties with respect to mechanical strength, heat resistance, chemical resistance and water resistance. The term "self-thermosettable" as used herein means the property of the molecules of the resin to form a network structure simply by addition reaction or addition condensation upon heating without the addition of a catalyst or curing agent.

DETAILED DESCRIPTION OF THE INVENTION

The polymer composition of the present invention consists essentially of:

(A) 90 to 50 wt% of a saturated polymer having in one molecule (1) at least two groups of at least one type selected from the group consisting of an epoxy group of the formula

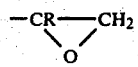

(R is hydrogen or methyl), an alcoholic or phenolic hydroxyl group and an alkoxymethyl-substituted acid amide group of the formula

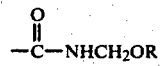

(R is an alkyl group of $C_1$ to $C_4$) and (2) a repeating unit made of a nonaromatic methylene group or methine group (this polymer is hereunder sometimes referred to as polymer A); and (B) 50 to 10 wt% of a monofunctional radical polymerizable monomer mixture consisting of (1) a radical polymerizable monomer having in one molecule at least one functional group selected form the group consisting of a carboxyl group, an acid anhydride group, an alcoholic hydroxy group, an alkoxymethyl-substituted acid amide group of the formula

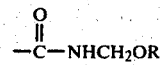

(R is an alkyl group of $C_1$ to $C_4$) and an amino group of the formula $-NR_1R_2$ ($R_1$ and $R_2$ are each an alkyl group of $C_1$ to $C_8$) and an ethylenic double bond (this monomer is hereunder sometimes referred to as B-1), and (2) a radical polymerizable monomer having one epoxy ring and one ethylenic double bond in one molecule (this monomer is hereunder sometimes referred to as B-2).

The polymer composition of the present invention is produced by blending polymer A with a monomer mixture of B-1 and B-2 in solution. The order of blending is not critical, and B-1 is first blended with polymer A and then B-2 is added, or B-2 is first added, then B-1. To increase the solubility of polymer A, monofunctional radical polymerizable monomers other than defined for B-1 or B-2 may be used as a third component. The blending of polymer A with the radical polymerizable monomers is effected at a temperature lower than 80° C., preferably between 0° and 50° C.

Specific examples of polymer A and monomer components B-1 and B-2 are listed below.

Polymer A (1) known epoxy resin typified by bisphenol A type diglycidyl ethers;

(2) saturated polyesters produced by reacting saturated divalent alcohols with saturated dibasic acids;

(3) saturated radical copolymers produced by a known method using at least one of the monomers included in B-1 or B-2; and (4) phenolic resins.

Component B-1

(1) carboxylic acids and anhydrides thereof: acrylic acid, methacrylic acid, acid anhydrides prepared from these acids and saturated monocarboxylic acids, maleic anhydride and itaconic anhydride, etc.;

(2) alcoholic compounds: monoesters such as 2-hydroxyethyl acrylate and 2-hydroxyethyl methacrylate derived from alkylene diols and radical polymerizable unsaturated monocarboxylic acids, N-methylolacrylamide, etc.;

(3) alkoxymethyl-substituted acid amides: $C_{1-4}$alkyl ether derivatives of N-methylolacrylamide such as N-n-butoxymethylacrylamide, or N-methylolmethacrylamide; and (4) amine compounds: dialkylaminoethyl acrylate esters, dialkylaminoethyl methacrylate esters, vinyl pyridines, etc.

Component B-2

(1) glycidiyl acrylate, glycidyl methacrylate, β-methylglycidyl acrylate, β-methylglycidyl methacrylate, etc.

Optional monomers

Liquid monomers having boiling points higher than 50° C. at atmospheric pressure such as styrene, vinyl toluene, alkyl esters of acrylic acid and methacrylic acid, and vinyl esters of monocarboxylic acids such as vinyl acetate.

The polymer composition of the present invention can be converted to a self-thermosettable organic formable polymeric material by irradiating a sheet of the composition (0.5 to 10 mm thick) with electron beams from an accelerator of an acceleration voltage of 500 kV to 3 MV at a temperature between −50° and 50° C. during the irradiation, the sheet is coated on both sides with a film having a thickness of 50 μ or more. The film is made of any material that will not dissolve in the monomer solution and which will not enter into substantial reaction with the monomers during the irradiation with electron beams, and an aluminum foil or polyester film are generally preferred.

The sheet of the polymer composition 0.5 to 10 mm thick is irradiated with electron beams from an accelerator of an acceleration voltage of 0.5 to 3 MV at a temperature between −50° and 50° C. until it sets.

The dose of irradiation varies with the dose rate, but usually, it is selected from between 0.5 and 30 Mrad. If the dose is less than 0.5 Mrad, the desired polymerization is not effected and if the dose is more than 30 Mrad, a crosslink cleaving reaction often takes place.

If the acceleration voltage is lower than 0.5 MV, the electron beams do not penetrate through every part of the sheet of the polymer composition and uniform polymerization does not occurs. If the voltage is greater than 3 MV, the penetration power of the electron beams is too great to be used in practical operations, and if the sheet thickness is increased to a level that is compatible with this penetration power, the heat of polymerization and radiation energy makes it difficult to control the temperature of the polymerization system without causing the cleavage of crosslinks. By limiting the irradiation temperature to be within the range of $-50°$ to $50°$ C., the cleavage of crosslinks is avoided and the polymer composition is given a viscosity sufficient to reduce the radiation dose necessary to set the polymer composition, which is an indication of the substantial completion of the polymerization. Cooling the polymerization system to below $-50°$ C. is not recommendable since it reduces the polymerization rate and is costly.

The organic formable, self-thermosettable polymeric material produced by irradiating the polymer composition of the present invention with electron beams contains the following polymers:

(1) a saturated polymer identified as polymer A;

(2) a copolymer produced from the radical polymerizable monomers B-1 and B-2 that contains at least one reactive group selected from among a carboxyl group, an acid anhydride group, an alcoholic hydroxyl group, an alkoxymethyl-substituted acid amide group and an amino group, and an epoxy ring as side chains; and (3) a graft copolymer comprising the backbone of saturated polymer (1) to which the copolymer (2) is attached as a graft.

These polymers react with each other upon heating to provide a crosslinked structure. Two methods are conventionally used to blend these dissimilar polymers uniformly: the dry blend process using a heater and a mixing-in-solution process using a solvent.

In the dry blend process, a crosslinking reaction occurs during the blending step and the obtained resin is not adapted to the subsequent forming into a film or other shaped articles. The mixing-in-solution process requires the additional step of evaporating the solvent before or during the forming step, and this simply results in the loss of thermal energy and possibly causes air pollution due to the evaporated solvent. Furthermore, dissimilar polymers generally have low miscibility and are difficult to blend uniformly.

These problems are satisfactorily solved by the present invention, which prepares a mixture of three reactive polymers not by blending them directly but by irradiating a mixture of a polymer and polymerizable monomers with electron beams. According to the present invention, graft polymer (3) is formed and this improves the miscibility of polymers (1) and (2). Obviously, thermal polymerization cannot be used to produce the desired mixture of three polymers (1) to (3); a crosslinking reaction partially takes place as early as at the time of preparing the desired polymer blend and it is difficult to form the resulting blend into various shapes. If γ-rays from Co-60 are used as ionizing radiation, the reaction time is prolonged and an undesired cleavage of crosslinks takes place as a side reaction.

By irradiating the polymer composition of the present invention with electron beams under the conditions specified above, a sheet of an organic self-thermosettable polymeric material that is formable in various shapes can be produced. In practical operations, the polymer composition must be ground into particles or granules of a suitable size before irradiation with electron beams.

The present invention is now described in greater detail by reference to the following examples and reference examples to which the scope of the invention is by no means limited.

EXAMPLE 1

An epoxy resin (120 g, ground particles of Epikote 1007 from Shell International Chemicals Corp.), glycidyl methacrylate (10 g), styrene (30 g) and ethyl acrylate (10 g) were put in a cylindrical separable flask (capacity: 500 ml) equipped with a stirrer, cooler, thermometer and a nitrogen feed pipe and were stirred for about 30 minutes at a bath temperature of about 50° C. until a homogeneous, high-viscosity mixture was formed. Methacrylic acid (20 g) was then added to the bath at 25° C., where it was stirred for another 30 minutes to produce a polymer composition.

REFERENCE EXAMPLE 1

A sheet having a thickness of about 5 mm was made from the polymer composition of Example 1 by holding it between two square polyester films (Diafoil from Mitsubishi Chemical Industries Ltd., 50μ thick and 30 cm on one side) and hydraulically pressing the assembly at a predetermined pressure. The sheet was covered with a commercial adhesive tape on the four sides, placed on a cooling tray through which brine ($-5°$ C.) was passed, and irradiated with 15 Mrad of electron beams from a cascaded accelerator (max. acceleration voltage: 3 MV, scan width: 60 cm) at an acceleration voltage of 2 MV and a current of 5 mA. The polyester films were stripped from the hard irradiated sheet, which was first crushed coarsely, then ground finely with a coffee mill type grinder for about 30 seconds. Five grams of the fine particles were sandwiched between two polyester films and hot-pressed at 150° C. and 100 kg/cm² G for 20 minutes to form a film having a thickness of about 200μ. The unpressed particles and the shaped film were extracted from tetrahydrofuran with a Soxhlet extractor and were found to have gel fractions 5.8% and 73%, respectively. It was therefore apparent that the shaped film had a crosslinked structure.

EXAMPLES 2-4 AND REFERENCE EXAMPLES 2-4

Polymer compositions were made as in Example 1 except that 20 g of methacrylic acid was replaced by the monomeric formulations shown in Table 1, each composition was subjected to the same experiment as conducted in Reference Example 1. The results are also shown in Table 1.

TABLE 1

| | Run No. | 2 | 3 | 4 |
|---|---|---|---|---|
| mono- | methacrylic acid | 10 | 10 | 10 |
| mers | 2-hydroxyethyl acrylate | 10 | | |
| | 2-hydroxyethyl methacrylate | | 10 | |
| | N—butoxyethylacrylamide | | | 10 |
| sheet thickness | | 5 | 5 | 3 |
| acceleration voltage | | 2 | 2 | 1.5 |
| current | | 5 | 5 | 5 |

TABLE 1-continued

| Run No. | 2 | 3 | 4 |
|---|---|---|---|
| dose of irradiation | 15 | 15 | 20 |
| percent gel fraction (before pressing) | 4.2 | 3.5 | 3.7 |
| percent gel fraction (after pressing) | 87 | 86 | 79 |

EXAMPLE 5 AND REFERENCE EXAMPLE 5

A polymer composition was prepared as in Example 1 except that the epoxy resin was replaced by a t-butyl substituted resol typephenolic resin (av. m. w.=830), and the composition was subjected to the same experiment as conducted in Reference Example 1 except that the irradiation dose was 25 Mrad and the fine particles of the irradiated composition were pressed at 100 kg/cm² G and 150° C. for 5 minutes. Acetone extraction showed a gel fraction of 0% for the unpressed particles and 98% for the shaped product.

EXAMPLES 6-10 AND REFERENCE EXAMPLES 6-10

Polymer compositions were prepared as in Example 1 from the polymerizable monomers listed in Table 2 and an alkyd resin with an acid value of 16 that was produced from 200 parts (by weight) of phthalic anhydride, 200 parts of stearic acid and 90 parts of glycerin by a conventional method (the alkyd resin is identified as "polyester" in Table 2). The polymer compositions were irradiated with electron beams under the conditions indicated in Table 2, and fine particles of the hard irradiated products were pressed into films at 100 kg/cm² G and 150° C. for 10 minutes. The films were subjected to Soxhlet extraction from methyl ethyl ketone for 8 hours and were found to have the gel fractions listed in Table 2.

TABLE 2

| | Run No. | 6 | 7 | 8 | 9 | 10 |
|---|---|---|---|---|---|---|
| | polyester g | 70 | 70 | 70 | 60 | 60 |
| I* | glycidyl methacrylate g | 10 | 5 | 5 | 10 | 10 |
| | styrene g | 10 | | | 10 | |
| | n-butyl acrylate g | | 10 | | | 10 |
| | ethyl acrylate g | | | 10 | | 10 |
| | methyl methacrylate g | | 10 | 10 | | 10 |
| II** | N,N—dimethylamino-ethyl methacrylate g | 10 | 5 | 5 | 10 | 10 |
| irradiation conditions | sheet thickness mm | 5 | 5 | 5 | 3 | 3 |
| | acceleration voltage MV | 2.0 | 2.0 | 2.0 | 1.5 | 1.5 |
| | current mA | 5 | 5 | 5 | 10 | 10 |
| | line temp. °C. | −5 | −5 | −5 | −20 | −20 |
| | dose of irradiation Mrad | 20 | 15 | 15 | 25 | 20 |
| | gel fraction % | 93 | 86 | 82 | 91 | 94 |

*stirred at 50° C. for 30 min.
**stirred at room temp. for 30 min.

What is claimed is:

1. A polymer composition which consists essentially of:
   (A) 90 to 50 wt% of a saturated polymer having in one molecule (1) at least two groups of at least one type selected from the group consisting of an epoxy group of the formula

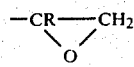

(R is hydrogen or methyl), an alcoholic or phenolic hydroxyl group and an alkoxymethyl-substituted acid amide group of the formula

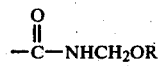

(R is an alkyl group of $C_1$ to $C_4$) and (2) a repeating unit made of a nonaromatic methylene group or methine group; and
   (B) 50 to 10 wt% of a nonfunctional radical polymerizable monomer mixture consisting of (a) a radical polymerizable monomer having in one molecule at least one functional group selected from the group consisting of a carboxyl group, an acid anhydride group, an alcoholic hydroxyl group, an alkoxymethyl-substituted acid amide group of the formula

(R is an alkyl group of $C_1$ to $C_4$) and an amino group of the formula —$NR_1R_2$ ($R_1$ and $R_2$ are each an alkyl group of $C_1$ to $C_8$) and an ethylenic double bond, and (b) a radical polymerizable monomer having one epoxy ring and one ethylenic double bond in one molecule.

2. A polymer composition according to claim 1 wherein the saturated polymer is an epoxy resin.

3. A polymer composition according to claim 1 wherein the saturated polymer is a saturated polyester prepared from a saturated divalent alcohol and a saturated dibasic acid.

4. A polymer composition according to claim 1 wherein the saturated polymer is a phenolic resin.

5. A polymer composition according to claim 1 wherein the radical polymerizable monomer (a) is a carboxylic acid.

6. A polymer composition according to claim 1 wherein the radical polymerizable monomer (a) is an alcoholic compound.

7. A polymer composition according to claim 1 wherein the alcoholic compound is a monoester derived from an alkylene diol and a radical polymerizable unsaturated monocarboxylic acid.

8. A polymer composition according to claim 1 wherein the alcoholic compound is N-methylolacrylamide.

9. A polymer composition according to claim 1 wherein the radical polymerizable monomer (a) is an alkoxymethyl-substituted acid amide.

10. A polymer composition according to claim 1 wherein the radical polymerizable monomer (a) is an amine compound.

11. A polymer composition according to claim 10 wherein the amine compound is selected from the group consisting of a dialkylamin ester of acrylic acid, a dialkylamino ester of methacrylic acid and vinyl pyridine.

12. A polymer composition according to claim 1 wherein the radical polymerizable monomer (b) is selected from the group consisting of glycidyl acrylate, glycidyl methacrylate, β-methylglycidyl acrylate and β-methylglycidyl methacrylate.

* * * * *